Aug. 30, 1927.
B. P. JOYCE
LIQUID LEVEL GAUGE
Filed Nov. 5, 1925        2 Sheets-Sheet 1
1,640,606
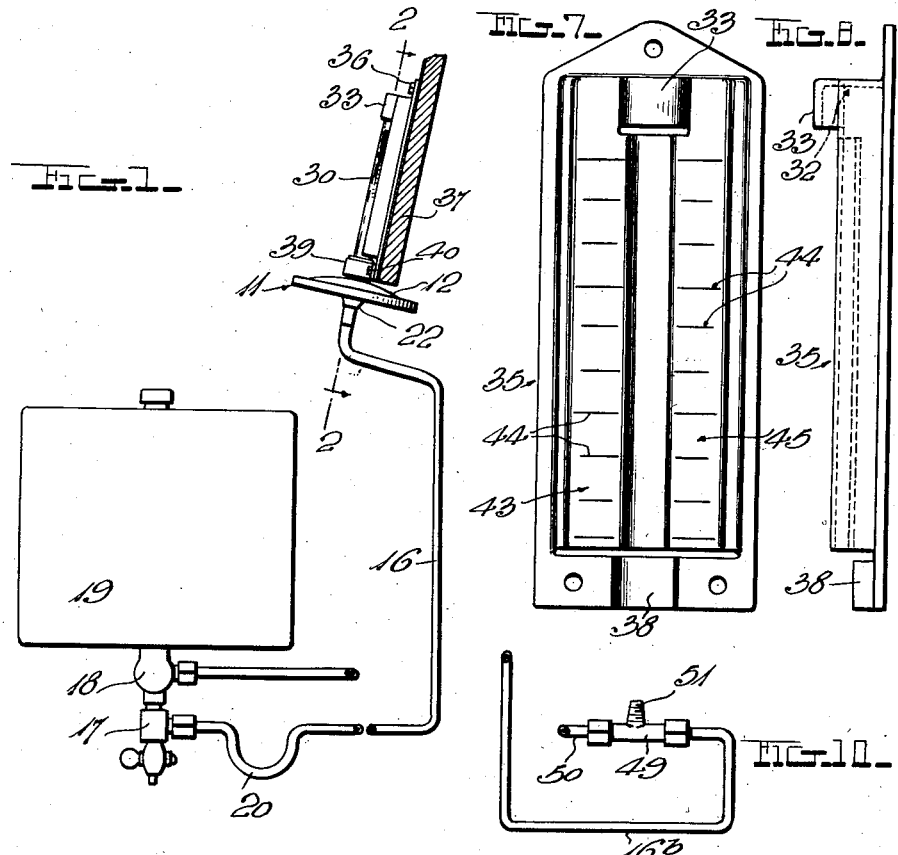
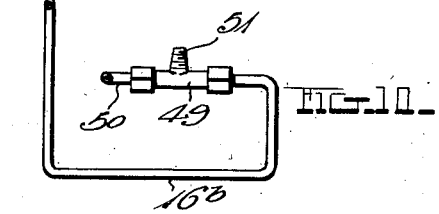
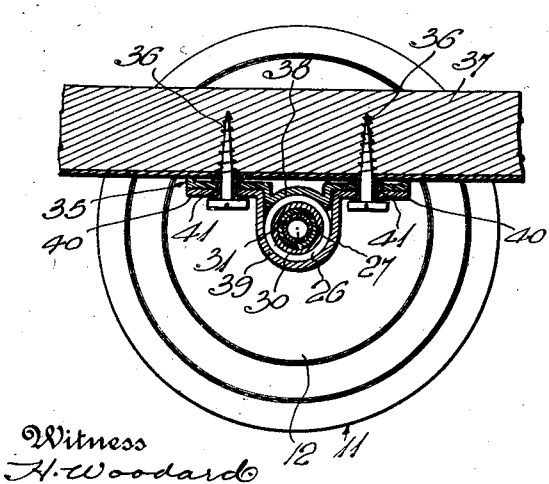
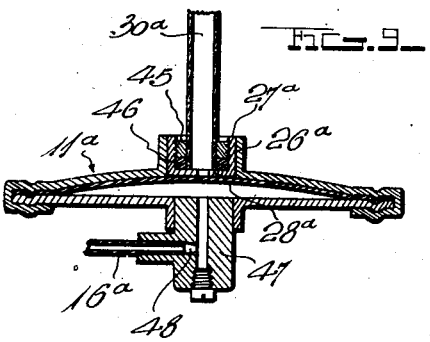
Inventor
B. P. Joyce
By H. B. Willson & Co.
Attorneys
Witness
H. Woodard

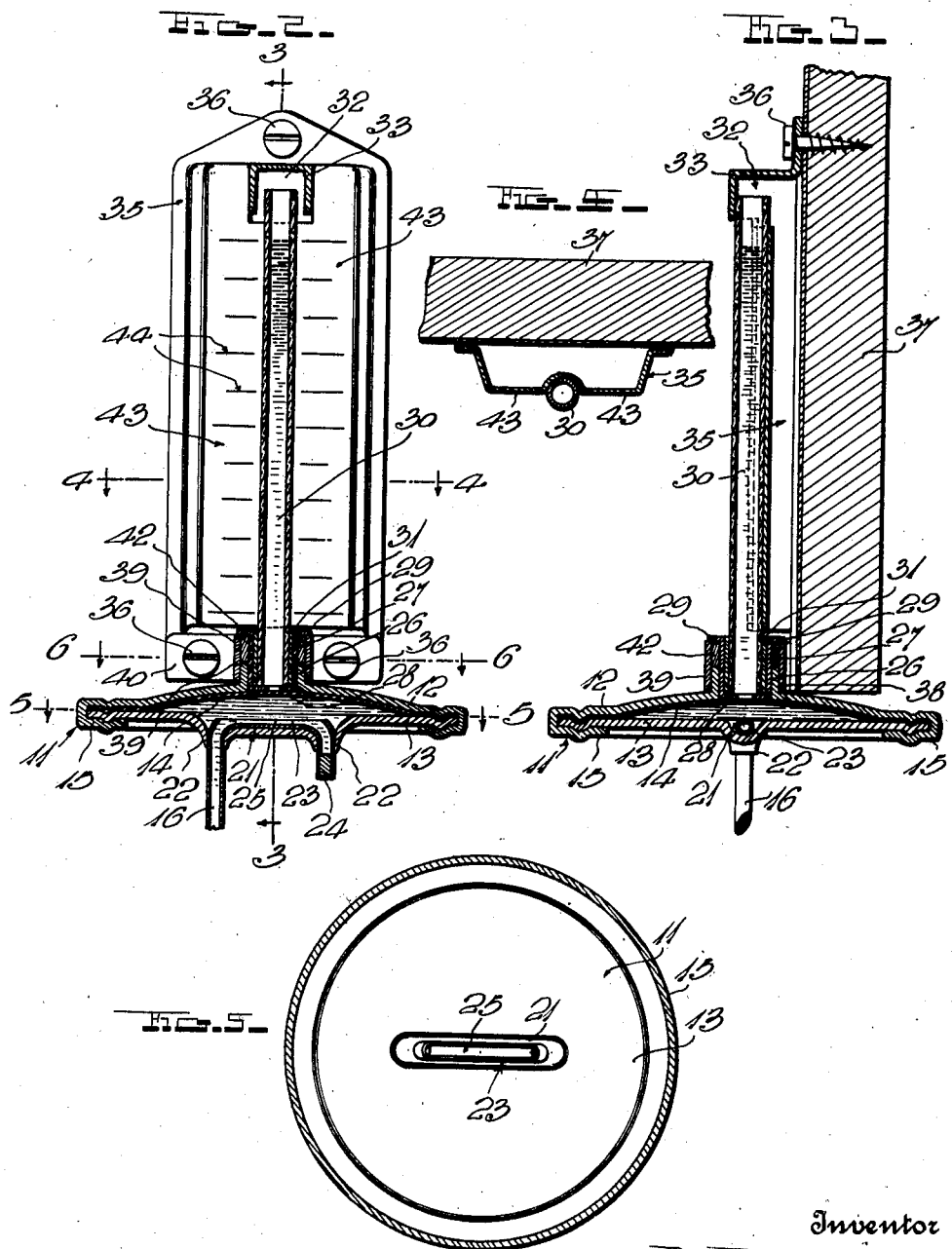

Patented Aug. 30, 1927.

1,640,606

UNITED STATES PATENT OFFICE.

BRYAN P. JOYCE, OF DAVENPORT, IOWA.

LIQUID-LEVEL GAUGE.

Application filed November 5, 1925. Serial No. 67,140.

The invention relates to improvements in gauges designed primarily for use in connection with the fuel tanks of automobiles, the device being of a type in which the level of liquid in the tank, controls the movements of a diaphragm, and in which this diaphragm controls ascent and descent of a colored indicating liquid in a gauge glass, the latter being mounted in full view of the driver.

The principal object of the invention is to provide a gauge of the type set forth which may be easily and inexpensively manufactured, may be installed with ease, and will be highly efficient and desirable.

Another object is to provide new and improved mounting means for the diaphragm casing and the gauge glass.

Another aim is to provide a unique construction in which two disks form the casing for the diaphragm and are secured together, as well as being secured to said diaphragm, by clinching the edge portion of one disk around the other disk.

A still further object is to provide a unique, simple and strong connection, between the diaphragm casing and the liquid tube which communicates either directly or indirectly with the fuel tank.

With the foregoing and minor objects in view, the invention resides in the novel subject matter hereinafter described and claimed, the description being supplemented by the accompanying drawings.

Figure 1 is a side elevation of the gauge mounted upon a dash or instrument board and operatively connected with the usual sediment bulb of a fuel tank.

Figure 2 is an enlarged vertical sectional view as indicated by line 2—2 of Fig. 1.

Figure 3 is a vertical section at right angles to Fig. 2, as indicated by line 3—3 thereof.

Figures 4, 5 and 6 are horizontal sectional views on lines 4—4, 5—5 and 6—6 of Fig. 2.

Figures 7 and 8 are respectively, a front elevation and an edge view of the main supporting member, at the front of which the gauge glass is located.

Figure 9 is a detail vertical sectional view showing different details of construction.

Figure 10 is a fragmentary side elevation illustrating one manner in which the gauge may be connected with the fuel line from the tank to the carbureter.

The form of construction shown in Figs. 1 to 8 will first be described. At 11, a substantially flat diaphragm casing is shown, the top plate or disk 12 of this casing however, being bowed away from the bottom plate or disk 13, so that the diaphragm 14 between said plates or disks, may divide the casing into upper and lower chambers. Preferably, the disk 12 is of greater diameter than the diaphragm 14 and the disk 13, and has its edge portion clinched around the edge portion of said disk 13, so as to firmly unite the two disks in a fluid-tight manner, as well as clamping the edge portion of the diaphragm 14 tightly in place.

A metal tube 16 communicates with the casing 11, under the diaphragm 14, and leads from a suitable connection 17 which is in communication with the sediment bulb 18 of the fuel tank 19, said tube 16 having a depressed portion or trap 20. When the device is installed, the tube 16 is entirely filled with liquid, preferably the same liquid as that used in the tank 19, and as the diaphragm casing is airtightly sealed, any rise or fall of the liquid in said tank 19, will effect movement of the diaphragm 14. This movement is utilized to operate indicating means within view of the driver, as will be hereinafter fully explained.

In the construction shown, the disk 13 is formed in its upper side with an elongated groove 21 and with downwardly stamped hollow nipples 22 at the ends of said groove. The tube 16 passes inwardly through one of these nipples, is provided with a lateral portion 23 lying in the groove 21, and this lateral portion is provided with a plugged or sealed end 24 which passes outwardly through the other nipple 22. By soldering or the like, the tube portions are secured in the two nipples and the groove and hence a very strong connection is provided between the tube and the casing 11. The upper side of the lateral tube portion 23 is cut away to form a slot 25 by means of which the tube 16 communicates with a portion of the casing 11, under the diaphragm 14.

The top disk 12 of the casing 11, is provided with an upwardly, projecting, rigid collar section 26. Secured within this collar section and projecting slightly above the same to form therewith a complete two-section collar, is a second collar section in the form of a metal sleeve 27 having an inwardly bent flange 28 at its lower end, and provided with a similar but outwardly bent flange 29 at its upper end, said flange 29 extending laterally beyond the collar section 26. A gauge glass 30 has its lower end received in the sleeve 27 and supported upon the flange 28, shellacked rubber or the like being interposed between the sleeve and the tube to form a liquid-tight connection between them.

The upper end of the gauge glass 30 is received in the space 32 within a hood 33 which projects from the upper end of a vertically elongated supporting member 35, to be secured by screws or the like 36 to an instrument board or the like 37.

When shipping the device, the space 32 may receive a cork placed in the upper end of the gauge glass 30, so that the indicating liquid may be shipped in the device without danger of spilling. The purchaser of course removes the cork, and the glass 30 is then in communication with the atmosphere. At its lower end, the support 35 is formed with a seat 38 which is engaged by the collar 26, and a U-shaped clamping strip 39 also engages said collar to hold the latter against the seat 38. The strip 39 is provided with lateral ends 40 and suitable fasteners, such as tubular rivets or eyelets 41 secure said ends 40 to the support 35. Two of the screws or the like 36 may well pass through these rivets or fasteners as shown in Fig. 6. The flange 29 lies upon the clamping strip 39 and the seat 38 and thus insures that no possible downward movement of the collar 26 and associated parts, may take place, with respect to the support 35. Preferably, a filler 42 is confined in the space between the sleeve 27 and the clamp 38—39, by the collar 26 and flange 29.

The gauge glass 30 is of course filled with an indicating liquid of any desired color, and the movements of the diaphragm 14 will control the distance to which this indicating liquid rises within said gauge glass. Preferably, the support 35 is provided with raised portions 43 along the gauge glass 30, which portions carry appropriate indicating marks or the like 44.

In the form of construction shown in Fig. 9, a diaphragm casing is shown, very similar to that above described, said casing being indicated at 11$^a$. This casing is provided with a collar section 26$^a$ having the same function as the collar section 26, and secured within this collar section, is a sleeve or inner color section 27$^a$ whose lower end is flanged as at 28$^a$ to assist in supporting a gauge glass 30$^a$. This gauge glass however is secured in place by a ring nut 45 and appropriate packing 46. In this same view, a different connection 47 is shown for establishing communication between the liquid tube 16$^a$ and the casing 11$^a$. The connection 47 preferably includes a minute port 48 which prevents undue fluctuation of the liquid and consequently overcomes fluttering of the diaphragm, but this same result can be obtained by using tubing having sufficiently small internal diameter.

In Fig. 10, a three-way connection 49 is shown. One end of this connection is joined to a gas line 50 leading from a tank, another branch 51 of the connection 49 is in the form of a nipple for threading into the fuel inlet of a carbureter, and a liquid tube 16$^b$ is connected to the third branch of the connection 49, said tube 16$^b$ being so bent as to form a trap, and then extending to a gauge such as that above described.

The construction herein disclosed is intended primarily for use in connection with Ford automobiles, but is not restricted to this particular application. Regardless of the type of machine with which the invention is used, it will be highly efficient and desirable. By choosing proper size tubing, the action of the diaphragm is damped, and a saving is effected in the cost of the tubing. Also, when this tubing is connected to the carbureter or the gas line, and it is of small size, it conducts very little if any heat and consequently will not expand the liquid in the gauge glass 30, to give an improper reading. The gauge is not affected by altitude, as the pressure on the liquid in the tank and the pressure on the liquid in the gauge glass are uniform. The gauge will always indicate when it is properly operating, as it answers to quick acceleration or quick speed checking of the motor car. Fluctuations are caused in the indicating liquid under these conditions, due to the inertia of the gasoline, and in order to dampen such movement, the communicating tube is of small cross section. A minimum amount of indicating liquid may be used in the device and hence there is very little danger of improper indication due to temperature changes. The construction of the diaphragm casing is such that the top disk thereof forms a stop to limit the upward diaphragm movement, and the liquid in the casing above said diaphragm, acts against the latter as more or less of a cushion, decreasing the diaphragm wear to the minimum. The diaphragm being substantially horizontal, prevents the trapping of air in the chamber above said diaphragm, so that such air can not interfere with proper operation of the device.

As excellent results are obtainable from the details disclosed, they are preferably followed. However, within the scope of the invention as claimed, variations may be made. For instance, although the collars 26—27 and 26$^a$—27$^a$ are each of two-part construction in the present disclosure, this sectional collar construction might well be replaced with a collar of other form.

The general combination of parts herein disclosed is claimed in my pending U. S. application Serial No. 21,190, filed April 6th, 1925.

I claim:—

1. In a gauge, a casing having a short upstanding collar, a gauge glass whose lower end only is fluid-tightly and securely mounted in said collar, said gauge glass communicating with the interior of said casing, and a support having a clamp surrounding and holding said collar to thereby support both the casing and the gauge glass.

2. In a gauge, a casing, a gauge glass communicating with and rising from said casing, the latter having an upwardly projecting rigid collar surrounding the lower end of said gauge glass, a support behind the gauge having a seat with which said collar is engaged, a U-shaped clamping strap engaging said collar and coacting with said seat in holding the collar and casing in rigid relation with the support, said strap having laterally directed ends, and fasteners securing said strap ends to said support.

3. A structure as specified in claim 1; said collar having an outwardly projecting flange lying upon said clamp to prevent accidental downward movement of the collar and casing.

4. A structure as specified in claim 1; said collar having an upper sleeve portion of less external diameter than the lower portion of said collar, the upper end of said sleeve portion being formed with a continuous outstanding flange lying upon said clamp, and a filler confined by said lower collar portion and flange in the space between the sleeve portion and clamp.

5. In a gauge, a casing having an annular upstanding collar section, a second collar section in the form of a sleeve securely fitting the inner side of the first named collar section, said sleeve having an inwardly bent flange at its lower end and an outwardly bent flange at its upper end, the upper flange projecting laterally beyond the exterior of said first named collar section, a gauge glass whose lower end is secured within said sleeve and rests on the lowermost flange thereof, and a support having means surrounding said first named collar section, said upper flange lying upon said means to support the casing against possible downward displacement.

6. A casing having an elongated groove in the inner side of one of its walls and openings at the ends of said groove, and a pliable tube passing inwardly through one of said openings and outwardly through the other of said openings and providing a lateral portion lying in said groove, said lateral portion being partly cut away to provide a slot by means of which the casing and tube communicate, and means fluid-tightly securing said tube in said openings and groove.

7. A device of the class described comprising a vertically elongated support, a casing detachably mounted at the lower end of said support, a gauge glass rising from said casing at the front of the support and adapted to receive an indicating liquid, and a hood projecting forwardly from the support and receiving the upper end of the gauge glass, sufficient space being provided in said hood to accommodate a cork when the latter is inserted in the upper end of the tube for the prevention of liquid spilling during shipment of the device.

In testimony whereof I have hereunto affixed my signature.

BRYAN P. JOYCE.